United States Patent
Hernandez et al.

(10) Patent No.: US 10,801,362 B2
(45) Date of Patent: Oct. 13, 2020

(54) SELF CENTERING UNISON RING

(71) Applicant: General Electric Company, Schenectady, NY (US)

(72) Inventors: Miguel Angel Hernandez, El Marquez (MX); Socrates Aviles, Corregidora (MX)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/012,035

(22) Filed: Jun. 19, 2018

(65) Prior Publication Data
US 2019/0383163 A1    Dec. 19, 2019

(51) Int. Cl.
*F01D 21/08* (2006.01)
*F02C 9/22* (2006.01)
*F02C 7/32* (2006.01)
*F01D 17/16* (2006.01)
*F02C 3/00* (2006.01)

(52) U.S. Cl.
CPC ............ *F01D 21/08* (2013.01); *F01D 17/162* (2013.01); *F02C 7/32* (2013.01); *F02C 9/22* (2013.01); *F02C 3/00* (2013.01); *F05D 2220/32* (2013.01); *F05D 2260/53* (2013.01)

(58) Field of Classification Search
CPC ...... F01D 17/162; F01D 17/165; F01D 21/08; F02C 3/00; F02C 7/32; F02C 9/22; F05D 2260/53; F05D 2220/32; F05D 2220/40
See application file for complete search history.

(56) References Cited

U.S. PATENT DOCUMENTS

| | | | |
|---|---|---|---|
| 3,739,894 A * | 6/1973 | Hinman | B65G 7/04 193/35 MD |
| 5,492,446 A | 2/1996 | Hawkins et al. | |
| 6,551,057 B1 | 4/2003 | Haaser et al. | |
| 7,244,098 B2 | 7/2007 | Bromann | |
| 7,753,647 B2 | 7/2010 | Giaimo et al. | |
| 8,875,687 B1 * | 11/2014 | Huang | F41B 5/143 124/24.1 |
| 9,422,825 B2 | 8/2016 | Do | |
| 9,777,641 B2 | 10/2017 | Kay et al. | |
| 9,890,655 B2 | 2/2018 | Leithead et al. | |

(Continued)

FOREIGN PATENT DOCUMENTS

GB    2550957 A * 12/2017 ........... F01D 17/162

*Primary Examiner* — Dwayne J White
*Assistant Examiner* — Eric A Lange
(74) *Attorney, Agent, or Firm* — Hanley, Flight and Zimmerman, LLC

(57) ABSTRACT

Centralizer apparatuses attached around a unison ring include rub buttons at inner ends of stud attached to and spaced apart from the unison ring and include rolling bearings. Each rolling bearing rotatably trapped within bearing chamber in bearing receptacle at inner end of stud.

Tip cap includes bearing aperture trapping rolling bearing within bearing chamber. Rolling bearing extends partially through bearing aperture. Rolling bearing may be spring loaded within chamber by spring between the bearing receptacle and the rolling bearing. Stud may extend through and may be threaded into mounting aperture in unison ring and nut may be threaded onto outer end of stud. Variable stator vanes rotatably mounted to a casing and connected to vane crank arms connected to the unison ring mounted exterior to casing.

16 Claims, 6 Drawing Sheets

(56) References Cited

U.S. PATENT DOCUMENTS

| | | |
|---|---|---|
| 2013/0210572 A1 | 8/2013 | Coles |
| 2016/0115966 A1 | 4/2016 | Wulf |
| 2016/0201504 A1 | 7/2016 | Hall |
| 2017/0122338 A1 | 5/2017 | Ramirez Ollervides et al. |
| 2018/0017080 A1* | 1/2018 | Walters .................. F02C 7/042 |
| 2018/0080338 A1 | 3/2018 | Kennedy |

* cited by examiner

SELF CENTERING UNISON RING

BACKGROUND OF THE INVENTION

Technical Field

This invention relates to self centering unison rings for rotating variable stator vanes in a gas turbine engine. More particularly, it relates to assemblies for centering the unison rings around a casing.

Background Information

Some gas turbine engines with variable stator vanes (VSV) include unison rings surrounding an engine casing and actuated by a linkage assembly (torque shaft, bellcrank or actuation lever) associated with an actuator. Such an assembly enables and coordinates movement of a plurality of stages of stator vanes responsive to controlled, changing engine conditions by way of crank arms connected to the unison ring for varying the angle of the vanes in each stage. The unison ring is mounted on carriers so that it is rotatable about its central axis which coincides with the engine axis.

If a unison ring is not properly centralized around the engine casing, it may impart vane angle errors within the variable vane assembly. Unison ring decentralization may be caused by gravity, assembly loads, the number of actuators, warpage, or a variety of operating conditions. In addition, the engine casing often experiences thermal expansion during operation. This thermal expansion can vary a gap between the unison ring and the engine casing. Devices have been used to centralize the unison ring and have included fixed rub tips mounted to the unison rings by radially extending studs. The rub tips are fixed relative to the studs and rub against the casing.

Mechanisms to properly center the unison ring on the engine casing should accommodate the varying tolerances caused by such thermal expansion. It is desirable to have a unison ring centering device that improves vane angle accuracy that minimizes variations caused by manufacturing, thermal expansion and other operating conditions. It is desirable to have a such a device that minimizes or reduces circumferential variation of the gap between the unison ring assembly and compressor case and unison ring assembly deflection during entire engine mission. It is desirable to have a such a device that minimizes or reduces lever arm, ring and clevises stresses and deflections and amount of hysteresis. It is also desirable to have a such a device that is easily maintained and repaired. It is desirable to have a such a device that allows free rotation of the unison ring.

SUMMARY OF THE INVENTION

A unison ring assembly includes a unison ring, centralizer apparatuses attached to and circumferentially distributed around the unison ring, at least one of the centralizer apparatuses including a rub button at a distal inner end of a stud attached to the unison ring, and the rub button being spaced apart from the unison ring and including a rolling bearing. The rolling bearing may be rotatably trapped within a bearing chamber in a bearing receptacle at the distal inner end of the stud.

A tip cap including a bearing aperture may trap the rolling bearing within the bearing chamber with the rolling bearing extending partially through the bearing aperture spring loading the rolling bearing within the chamber with a spring between the bearing receptacle and the rolling bearing. The stud may extend longitudinally or radially through a mounting aperture in the unison ring. The stud may be threaded into the mounting aperture and a nut may be threaded onto a distal outer end of the stud for securing the stud in the mounting aperture.

The rolling bearing may have a bearing diameter greater than an aperture diameter of the bearing aperture. The tip cap may include an internally threaded annular tip wall threaded on to an externally threaded annular receptacle wall of the bearing receptacle. The spring may surround a portion of the rolling bearing.

The rolling bearing may be a ball bearing or a roller bearing and have a bearing diameter greater than an aperture diameter of the bearing aperture.

The unison ring assembly may be used in a variable stator vane actuation assembly for varying angles of variable stator vanes rotatably mounted to a casing and connected to vane crank arms connected to the unison ring assemblies mounted exterior to the casing. The unison ring assemblies including unison rings surrounding the casing and centralizer apparatuses attached to and circumferentially distributed around the unison rings.

DETAILED DESCRIPTION OF THE INVENTION

Figure 1:
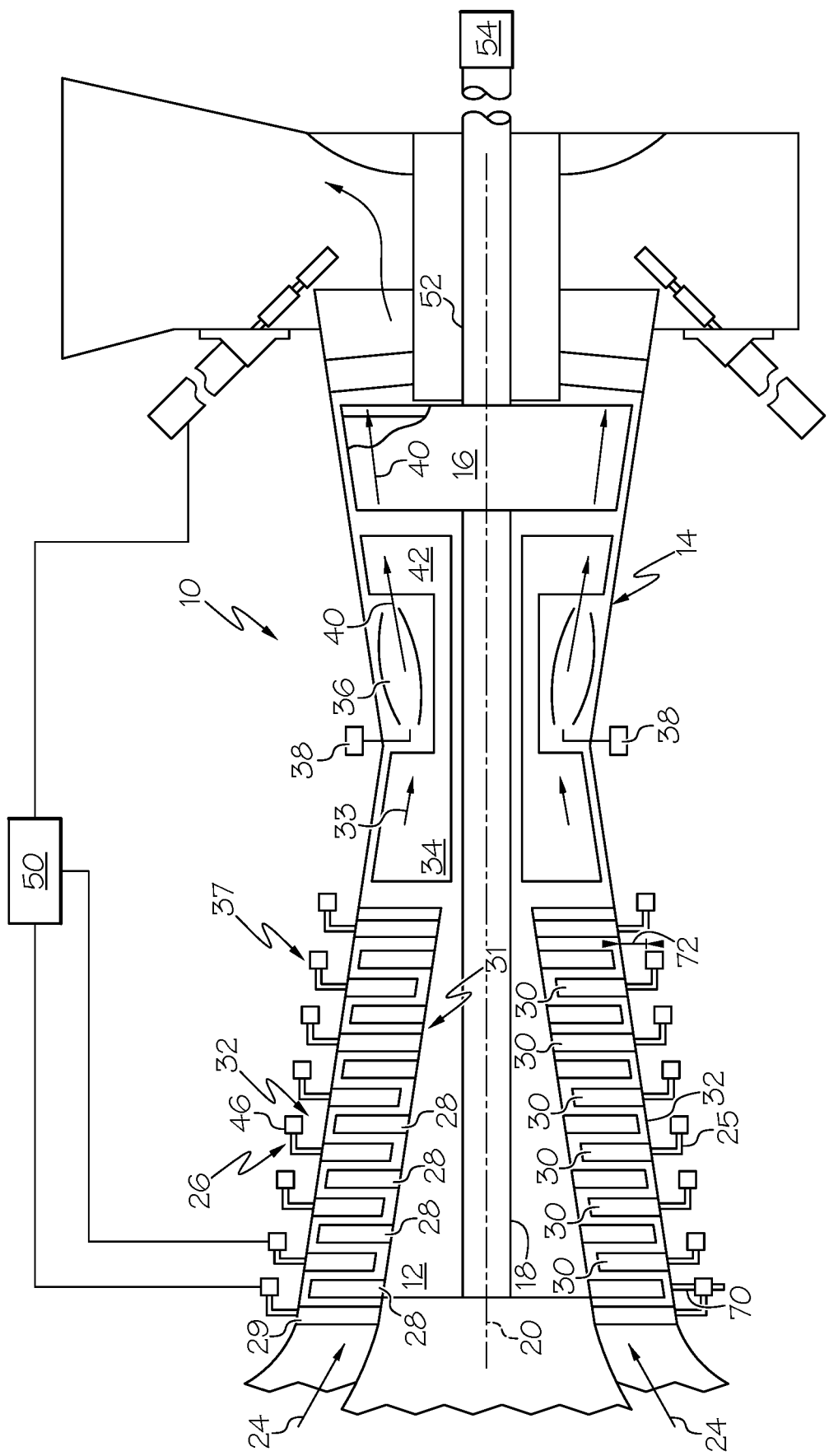
FIG. 1 is a centerline sectional schematic illustration of a gas turbine engine having a compressor section with variable stator vanes activated by unison rings centered around a compressor casing by centralizer apparatuses.

FIG. 1 illustrates an exemplary gas turbine engine 10, including in serial flow relationship a compressor 12, a core engine 14, and a low-pressure or power turbine 16 having a first rotor shaft 16 conventionally joined to the compressor 12 for providing power thereto, all disposed coaxially about a longitudinal centerline axis 20. An output shaft 52 from the power turbine 16 may be used to drive an electrical generator 54 or some other device. The compressor 12 compresses an inlet airflow 24 to provide a compressed airflow 33 to the core engine 14 having a conventional high-pressure compressor (HPC) 34 which further compresses at least a portion of the compressed airflow 33 and channels it to a combustor 36. Fuel injection means 38 provides fuel to the combustor 36 wherein it is mixed with the compressed airflow for generating combustion gases 40 which are conventionally channeled to a conventional high-pressure turbine (HPT) 42. The HPT 42 is conventionally joined to the HPC 34 by the first rotor shaft 18.

The compressor 12 includes a variable inlet guide vane 29 followed by a plurality of circumferentially spaced rotor blades 28 and variable stator vanes (VSV) 30 disposed in several rows 31. Illustrated are seven rows of the rotor blades 28 and seven rows 31 of the variable stater vanes 30 surrounded by an engine or compressor casing 32. Stator vanes 30 direct inlet airflow 24 at the desired angle into the rotor blades 28. Variable inlet guide vane 29 and variable stator vanes 30 direct inlet airflow 24 into rotor blades 28 at various angles depending on engine operating conditions to improve compressor stall margin and to improve fuel efficiency of the engine. An engine control 50, such as a mechanical or digital electronic control, is used to control operation of the engine 10 including the varying of the VSVs 30.

Figure 2:
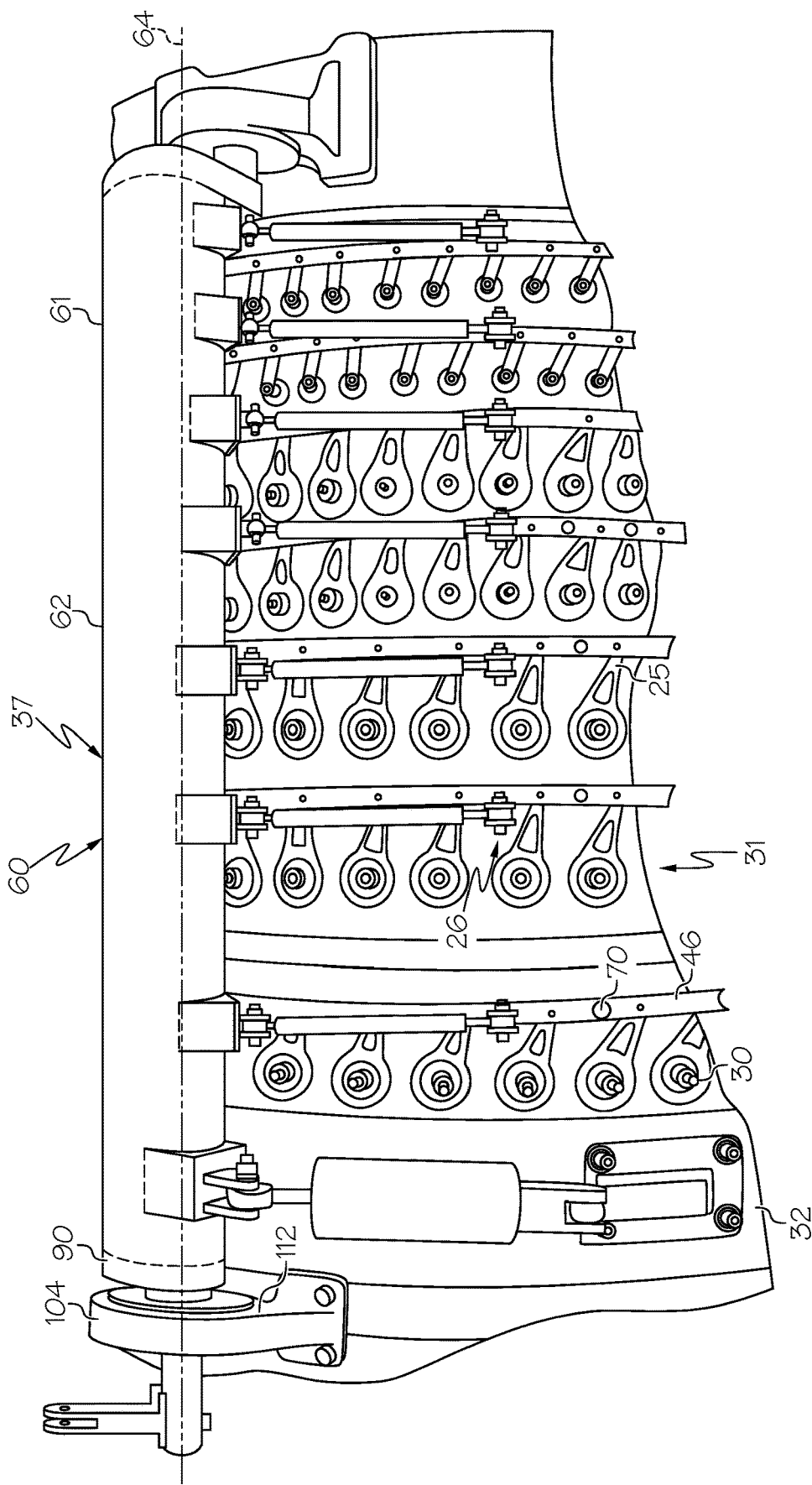
FIG. 2 is a sideways looking perspective view illustration of the compressor section and the unison rings illustrated in FIG. 1.

Illustrated in FIGS. 1-2 is a variable stator vane actuation apparatus 37 for varying the angles of the variable stator vanes 30 illustrated in FIG. 1. The variable stator vanes 30 are rotatably mounted to the compressor casing 32 and are rotatably actuated by and connected to vane crank arms 25 connected to unison ring assemblies 26 mounted exterior to the compressor casing 32. The variable stator vane actuation apparatus 37 vary the angles of the VSVs with respect to airflow 24. Variable stator vanes 30 and associated actuation devices in an HPC are well known in the field of gas turbine engines as indicated in the references above. A torque shaft assembly 60 is illustrated on the compressor casing 32 of the compressor of the engine 10. Though only one torque shaft assembly 60 is illustrated, two are typically used, one on each side of the engine or about 180 degrees apart from each other with respect to the longitudinal centerline axis 20. The torque shaft assembly 60 is used for actuating devices such as the variable stator vanes 30.

Figure 3:
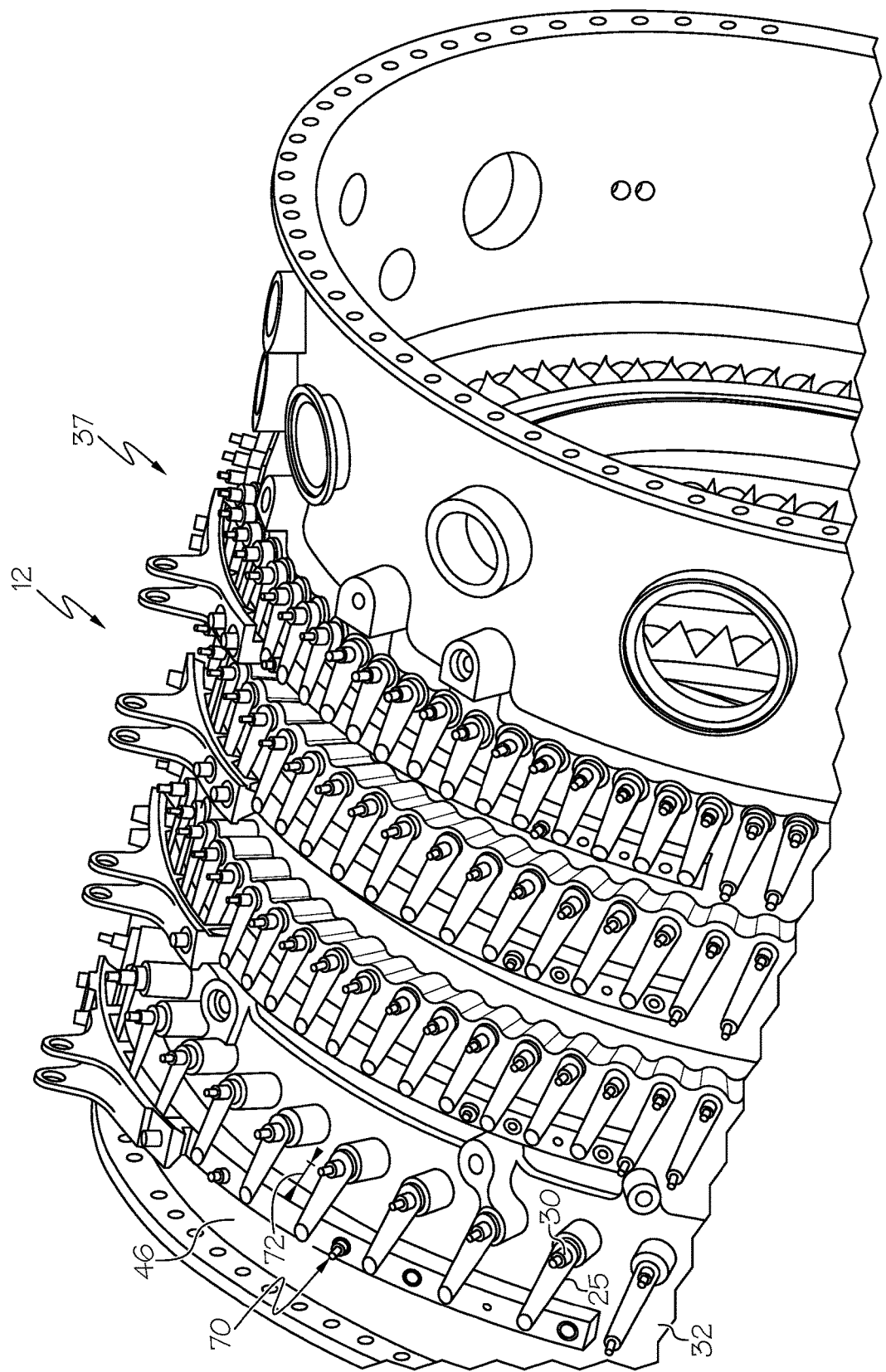
FIG. 3 is an aft looking forward perspective view illustration of the compressor casing and the unison rings illustrated in FIG. 2.

Referring to FIGS. 2 and 3, the torque shaft assembly 60 includes a torque shaft 61 which may be a hollow metal tube 62 as illustrated in the exemplary embodiment disclosed herein. The tube 62 is pivotable about its tube axis 64 enabling the tube 62 to operate as a single crank and pivot about the tube axis 64 and apply torque and supply power to move associated unison rings 46. Centralizer apparatuses 70 circumferentially attached to and disposed around the unison rings 46 are designed to maintain gaps 72 between the unison rings 46 and the casing 32.

Figure 4:
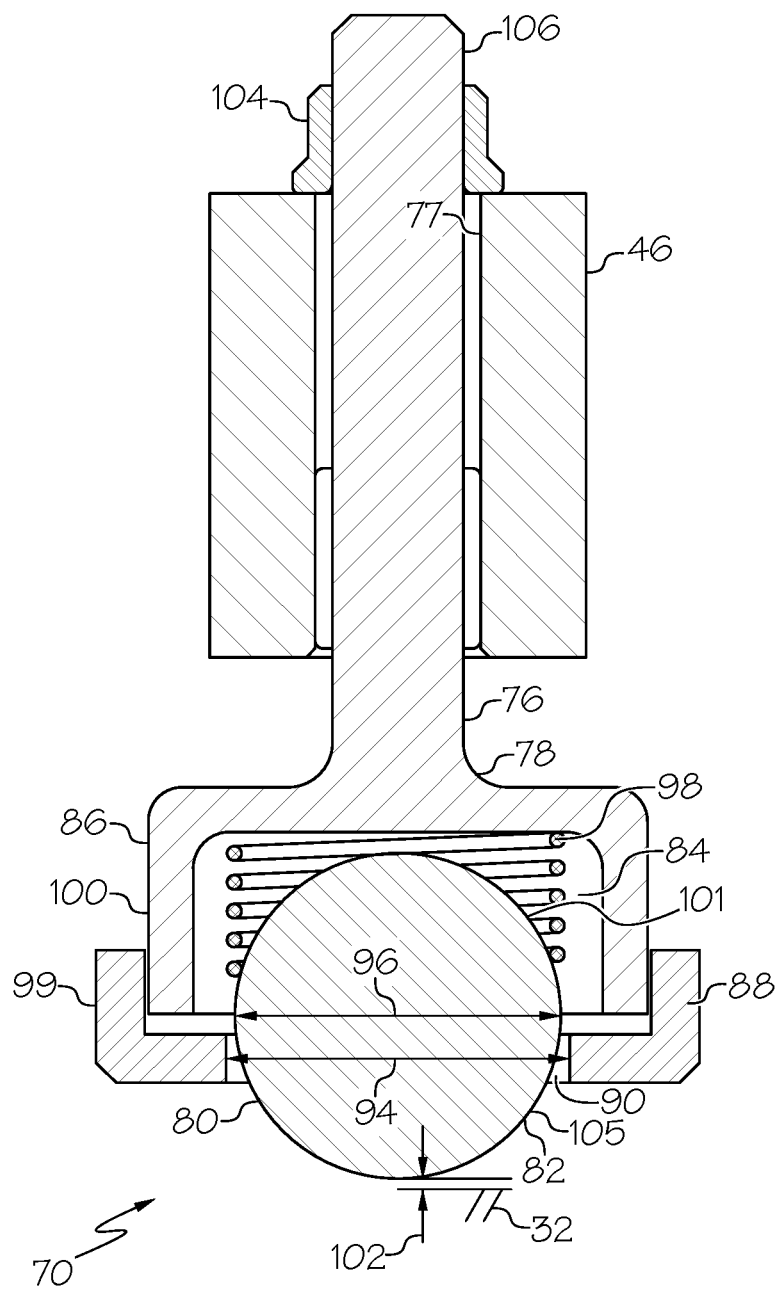
FIG. 4 is a sectional view illustration of a first exemplary embodiment of the centralizer apparatus illustrated in FIG. 2 with a ball bearing rub tip.
Figure 5:
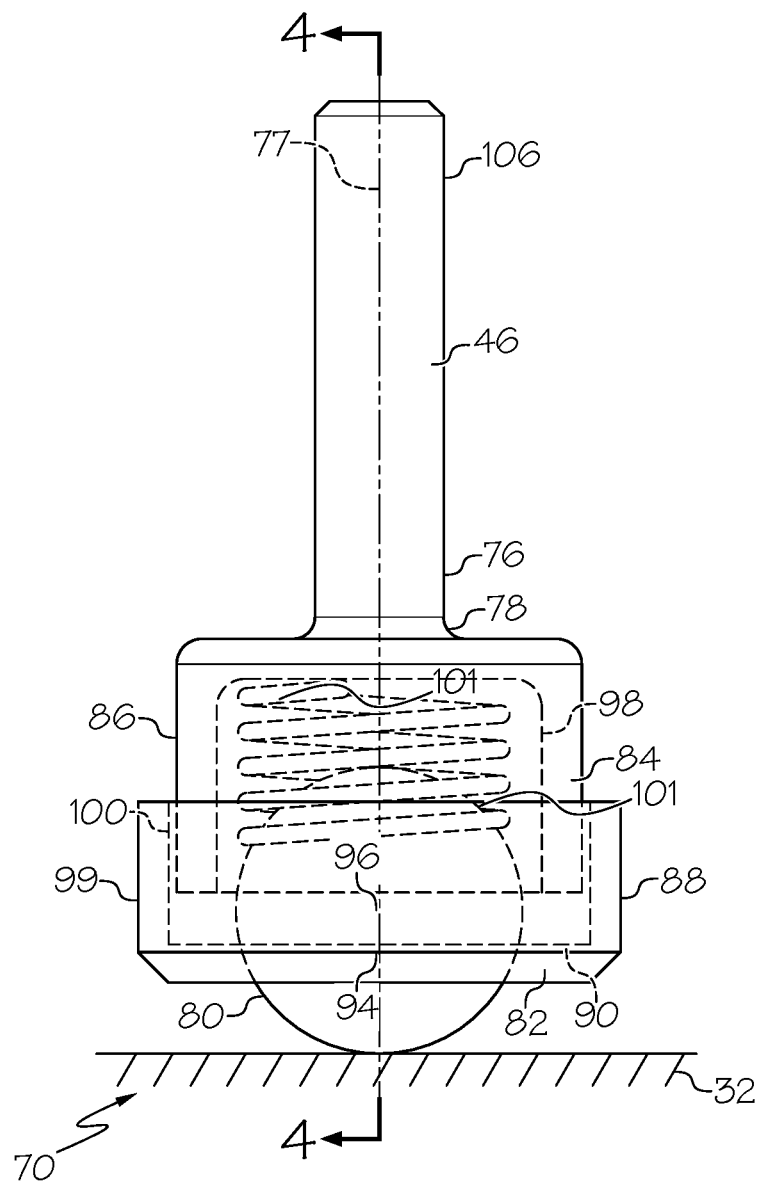
FIG. 5 is a side view illustration of the first exemplary embodiment of the centralizer apparatus illustrated in FIG. 4

Referring to FIGS. 4 and 5, each centralizer apparatus 70 includes a stud 76 secured to the unison ring 46. The stud 76 may extend longitudinally or radially through a mounting aperture 77 in the unison ring 46. A rub button 80 including a rolling bearing 82 is located at a distal inner end 78 of the stud 76 and spaced apart from the unison ring 46. The rolling bearing 82 is operable for contacting the casing 32. The rolling bearing 32 is rotatably trapped within a bearing chamber 84 in a bearing receptacle 86, which may be annular as illustrated herein, at the distal inner end 78 of the stud 76. A tip cap 88 including a bearing aperture 90 attached to the bearing receptacle 86 traps the rolling bearing 82 within the bearing chamber 84. The rolling bearing 82 extends partially through the bearing aperture 90. The rolling bearing 82 has a bearing diameter 84 greater than an aperture diameter 96 of the bearing aperture 90. The tip cap 88 may be threaded onto or otherwise removably attached to the bearing chamber 84 for easy removal and replacement of the rolling bearing 82. Thus, the rolling bearing 82 may be sacrificial.

The rolling bearing 82 may be spring leaded against the bearing aperture 90 by a spring 98 between the bearing receptacle 86 and the rolling bearing 82. The spring 98 may surround a portion 101 of the rolling bearing 82 as illustrated herein. The tip cap 88 may include an internally threaded annular tip wall 99 threaded on to an externally threaded annular receptacle wall 100 of the bearing receptacle 86. The rolling bearing 82 extends partially through the bearing aperture 90 to contact the casing 32. The stud 76 may be threaded into the mounting aperture 77 for adjusting a distance 102 between the rolling bearing 82 and the casing 32. A nut 104 threaded onto a distal outer end 106 of the stud 76 may be used to secure the stud 76 in the mounting aperture 77, to the unison ring 46, and set the distance 102 between the rolling bearing 82 and the casing 32.

Figure 6:
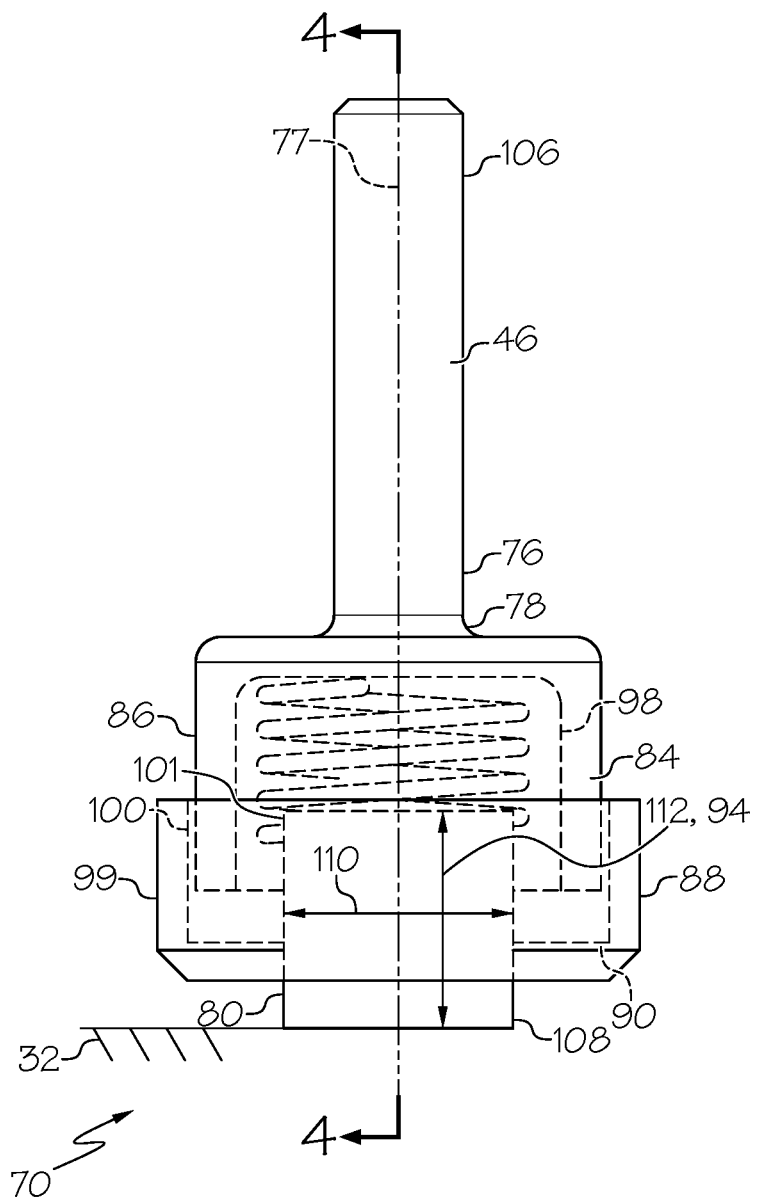
FIG. 6 is a sectional view illustration of a second exemplary embodiment of the centralizer apparatus illustrated in FIG. 2 with a roller bearing rub tip.

FIGS. 4 and 5 illustrate a centralizer apparatus 70 having a ball bearing 105 rolling bearing 82 that is spherical. FIG. 6 illustrates a centralizer apparatus 70 having a cylindrical or roller bearing 108 rolling bearing 82 that is cylindrical. The cylindrical roller bearing 108 has a length 110 and a width 112 or bearing diameter 94. FIG. 4 may be used to illustrate that the cylindrical roller bearing 108 has a bearing diameter 94 or width 112 greater than an aperture diameter 96 of the tip cap 88 illustrated in FIG. 6.

The present invention has been described in connection with specific examples, embodiments, materials, etc. However, it should be understood that they are intended to be representative of, rather than in any way limiting on, its scope. Those skilled in the various arts involved will understand that the invention is capable of variations and modifications without departing from the scope of the appended claims.

What is claimed:

1. A unison ring assembly comprising:
a unison ring;
centralizer apparatuses attached to and circumferentially distributed around the unison ring;
at least one of the centralizer apparatuses including a rub button at a distal inner end of a stud attached to the unison ring; and
the rub button being spaced apart from the unison ring and including a rolling bearing rotatably trapped within a bearing chamber in a bearing receptacle at the distal inner end of the stud;
a tip cap positioned on an end of the bearing receptacle and including a bearing aperture trapping the rolling bearing within the bearing chamber, wherein the rolling bearing extends partially through the bearing aperture; and
a spring positioned between the bearing receptacle and the rolling bearing such that the rolling bearing is spring loaded within the chamber, wherein the spring surrounds and contacts a portion of the rolling bearing.

2. The assembly as claimed in claim 1 further comprising the stud extending longitudinally or radially through a mounting aperture in the unison ring.

3. The assembly as claimed in claim 2 further comprising the stud threaded into the mounting aperture and a nut threaded onto a distal outer end of the stud for securing the stud in the mounting aperture.

4. The assembly as claimed in claim 1 further comprising the rolling bearing having a bearing diameter greater than an aperture diameter of the bearing aperture.

5. The assembly as claimed in claim 4 further comprising the tip cap including an internally threaded annular tip wall threaded on to an externally threaded annular receptacle wall of the bearing receptacle.

6. The assembly as claimed in claim 5 further comprising the stud extending longitudinally or radially through a mounting aperture in the unison ring.

7. The assembly as claimed in claim 6 further comprising the stud threaded into the mounting aperture and a nut threaded onto a distal outer end of the stud for securing the stud in the mounting aperture.

8. The assembly as claimed in claim 1 further comprising the rolling bearing being a ball bearing or a roller bearing and having a bearing diameter greater than an aperture diameter of the bearing aperture.

9. The assembly as claimed in claim 8 further comprising:
the tip cap including an internally threaded annular tip wall threaded on to an externally threaded annular receptacle wall of the bearing receptacle,
the stud extending longitudinally or radially through a mounting aperture in the unison ring,
the stud threaded into the mounting aperture and a nut threaded onto a distal outer end of the stud for securing the stud in the mounting aperture.

10. A variable stator vane actuation assembly for varying angles of variable stator vanes, the assembly comprising:
variable stator vanes rotatably mounted to a casing and connected to vane crank arms connected to unison ring assemblies mounted exterior to the casing;
each unison ring assembly including a unison ring surrounding the casing and centralizer apparatuses attached to and circumferentially distributed around the unison ring,
at least one of the centralizer apparatuses including a rub button at a distal inner end of a stud attached to the unison ring;
the rub button being spaced apart from the unison ring and including a rolling bearing rotatably trapped within a bearing chamber in a bearing receptacle at the distal inner end of the stud;
a tip cap positioned on an end of the bearing receptacle and including a bearing aperture trapping the rolling bearing within the bearing chamber, wherein the rolling bearing extends partially through the bearing aperture; and
a spring positioned between the bearing receptacle and the rolling bearing such that the rolling bearing is spring loaded within the chamber, wherein the spring surrounds and contacts a portion of the rolling bearing.

11. The assembly as claimed in claim 10 further comprising the stud extending longitudinally or radially through a mounting aperture in the unison ring.

12. The assembly as claimed in claim 11 further comprising the stud threaded into the mounting aperture and a nut threaded onto a distal outer end of the stud for securing the stud in the mounting aperture.

13. The assembly as claimed in claim 10 further comprising the rolling bearing having a bearing diameter greater than an aperture diameter of the bearing aperture.

14. The assembly as claimed in claim 13 further comprising the tip cap including an internally threaded annular tip wall threaded on to an externally threaded annular receptacle wall of the bearing receptacle.

15. The assembly as claimed in claim 10 further comprising the rolling bearing being a ball bearing or a roller bearing and having a bearing diameter greater than an aperture diameter of the bearing aperture.

16. The assembly as claimed in claim 15 further comprising:
the tip cap including an internally threaded annular tip wall threaded on to an externally threaded annular receptacle wall of the bearing receptacle,
the stud extending longitudinally or radially through a mounting aperture in the unison ring,
the stud threaded into the mounting aperture and a nut threaded onto a distal outer end of the stud for securing the stud in the mounting aperture.

\* \* \* \* \*